Aug. 16, 1932.  J. F. McKEE  1,872,089
EXPANSION JOINT
Filed Oct. 22, 1930  2 Sheets-Sheet 1
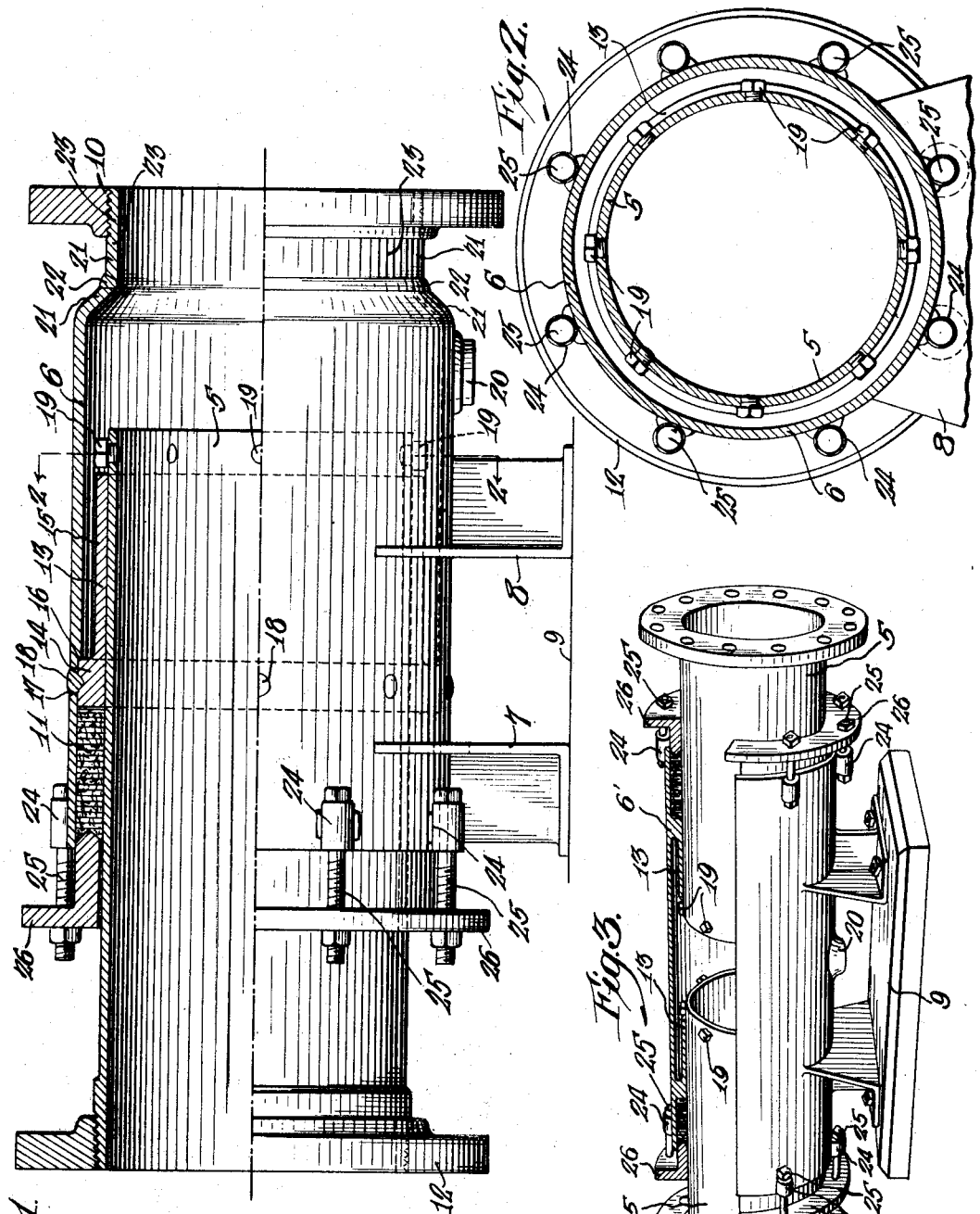

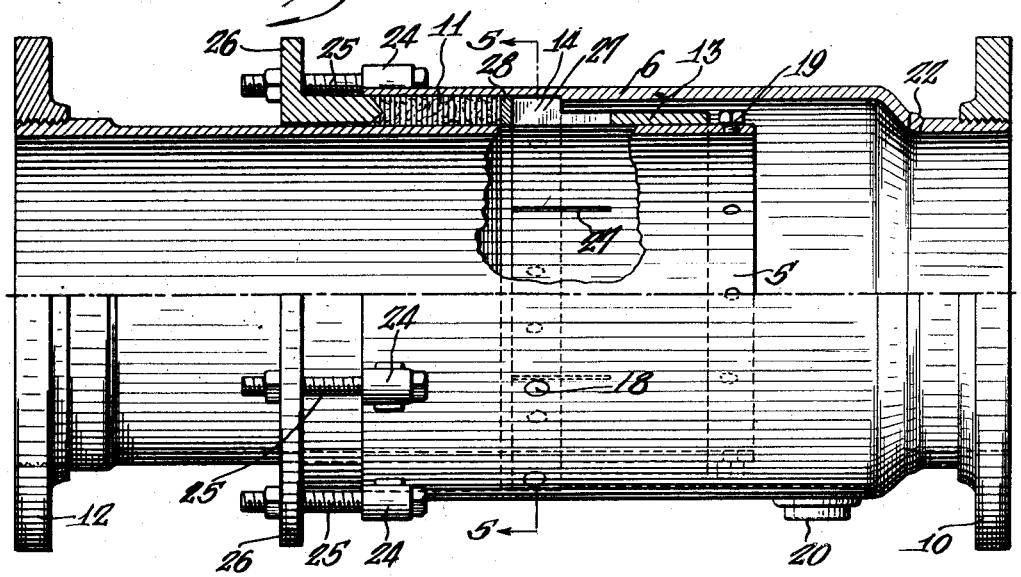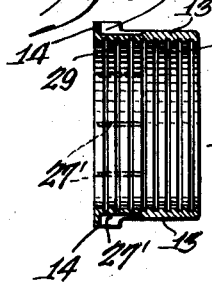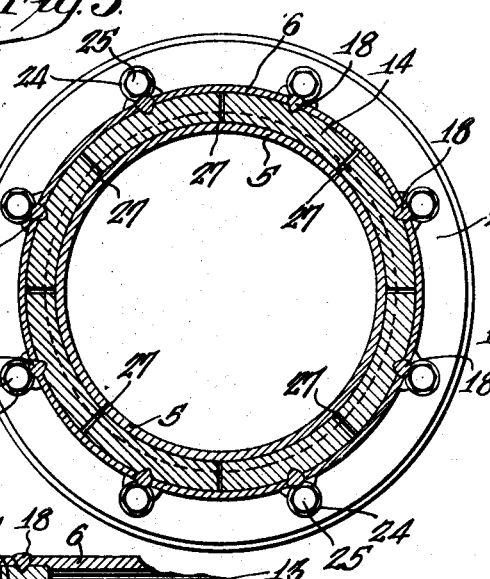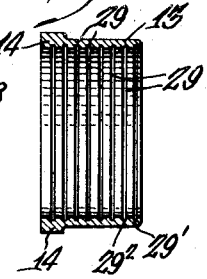

Patented Aug. 16, 1932

1,872,089

UNITED STATES PATENT OFFICE

JOHN F. McKEE, OF LANSDOWNE, PENNSYLVANIA, ASSIGNOR TO YARNALL-WARING COMPANY, OF PHILADELPHIA, PENNSYLVANIA, A CORPORATION OF PENNSYLVANIA

EXPANSION JOINT

Application filed October 22, 1930. Serial No. 490,474.

My invention relates to expansion joints with particular reference to an expansion joint for use in a line conveying steam or other hot fluid.

A purpose of my invention is to provide the inner slide member of an expansion joint with a cylindrical guide, spaced well inwardly from the outer shell for a considerable portion of its length and internally fitting and secured to the outer shell.

A further purpose is to space safety stops circumferentially around the inner end of the inside slide member of a joint of the character indicated, the stops being adapted to engage the end of a cylindrical guide for the slide to prevent any accidental opening of the joint, as in the event of a failure of a pipe anchor.

A further purpose is to space safety stops of the character indicated widely apart to permit an easy automatic displacement during the joint expansion of any foreign matter such as scale depositing upon the outside of the slide beyond the end of the slide guide.

A further purpose is to slit a cylindrical guide for a sliding member of an expansion joint so that steam will be admitted at points around the cylindrical guide to uniformly expand the guide with respect to the sliding member.

A further purpose is to provide circumferential inner recesses for a cylindrical guide for the sliding member of an expansion joint at spaced joints along the guide.

A further purpose is to connect a trap with an expansion joint of the character indicated in a steam line, preferably with the outer member of the joint, in order to prevent water accumulation in the space between the outer member and a guide for the inner slide and thus avoid temperature differentials between the inner slide and the cylindrical guide which might otherwise be caused by the presence of water.

A further purpose is to weld the connecting portions of the outer shell member of a joint of the character indicated to a tubular body preferably of rolled steel or wrought iron in order to secure a smallness of radial extension that adapts the joint to installation in any duct large enough to receive the standard flanges of the pipe with which the joint is used.

A further purpose is to provide either single or double joints of the character indicated which shall embody the features of my invention.

Further purposes will appear in the specification and in the claims.

I have elected to show a few only of the many forms of my invention, selecting forms that are practical and efficient in operation and which well illustrate the principles involved.

Figure 1 is a longitudinal elevation, half section, illustrating structure embodying a desirable form of my invention.

Figure 2 is a section of Figure 1 taken upon the line 2—2 thereof.

Figure 3 is a reduced scale perspective view, in part section, showing a different form from that illustrated in Figures 1 and 2 which show a single expansion joint, while Figure 3 shows a double joint.

Figure 4 is a longitudinal elevation, half section and partly broken, corresponding generally to Figure 1, but showing the guide provided with slits.

Figure 5 is a section on the line 5—5 of Figure 4.

Figure 6 is a broken section showing part of the structure seen in Figure 4, but with the guide circumferentially recessed.

Figure 7 is an isolated axial section of the guide of Figure 6.

Figure 8 is an isolated axial section of a guide somewhat different from that shown in Figure 6.

Like numerals refer to like parts in all figures.

Describing in illustration and not in limitation and referring to the drawings:—

The single joint shown in Figures 1 and 2 includes inner and outer telescoping shell members 5 and 6, the outer shell member having, spaced beyond the open end of the inner member, a flanged end 10 reduced to the diameter of the inner member which is preferably the same as that of the piping with which the joint is to be used.

The outer shell member may carry spaced brackets or feet 7 and 8 for fastening to a suitable stationary base 9, though this is not necessary to my invention.

The inner shell 5 comprises a sleeve adapted to slide within a stuffing box 11 on the outer member in order to accommodate changes in length of the pipe section fastened to the inner shell at the flange 12.

The slidable shell 5 is guided by a cylinder 13 which is enlarged outwardly at 14 to form the bottom of a packing box 11, the inwardly extending portion 15 of the cylinder being spaced a considerable distance from the inside of the outer member 6.

The outer shell interior is counterbored to receive the enlarged end 14 of the cylinder guide and to provide a shoulder 16 for supporting the end 14 from moving inward.

The cylinder guide 13 is pushed to place against the shoulder 16 at the bottom of the counterbore and then is preferably welded to the outer shell at spaced intervals around the shell, suitable bores 17 through the outer shell extending a little distance into the body of the enlarged portion of the guide, after which the holes are filled with welding material 18.

The inner end of the inner shell is provided with cap screws 19 or the like suitably spaced around the circumference.

The heads of these screws project across the end of the cylinder guide 13 and provide safety stops for avoiding any danger of the joint pulling open if an anchor upon either one of the relatively sliding members of the pipe line fails while the pipe is being subjected to high internal pressure.

I prefer to weld or otherwise rigidly fasten the cylinder guide member 13 to the outer member although this is not essential.

If the guide member 13 is not rigidly fastened to the outer shell there may be danger of some displacement, which I prefer to avoid, but recognize that the integral union between the members is not essential and that there are some advantages in keeping the guide member separable from the outside pipe 6.

The screws 19 around the end of the inner slide member are inserted after the placement of the guide member over the end of the slide and optionally before the insertion of the guide member into the open end of the outer case.

If they are inserted before the welding of the guide to the outer member, the inner member and guide with the screws in place are assembled and then welded at 18.

If the studs are inserted after the assembly of the cylinder guide in the outer shell, I insert the studs through a suitable hole, as at 20, turning the inner slide on its own axis to bring the threaded holes for the studs 19 successively into registry with the opening 20, closing the opening 20 in any suitable way after the insertion of all the screws, as by connecting a trap to the opening.

In practice it is a matter of considerable importance that the joint shall have a strength at least as great as that of the pipe with which it is to be used, that it shall be as light as possible and that it shall have a sufficient smallness of radial extension to permit the joint to be placed in any duct large enough to take the pipe with which the joint is to be used, so that I limit the radial extension of the joint to that of the standard flanges on the pipe with which the joint is used.

I provide a close fit between the engaging surfaces of the slide 5 and the cylinder guide 13, and preferably polish and then plate the slide with chromium in order to avoid danger of corrosion of the bearing surfaces. The use of a chromium-plated slide 5 in contact with a soft guide 13 is very advantageous as friction is reduced. Plating of the slide also reduces friction with the packing 11.

I also avoid danger of the bearing surfaces sticking or "freezing" together when subjected to service in steam or other lines by provisions for avoiding temperature differentials between the slide and its guide.

In order to secure maximum strength and lightness I use a tubular steel for the shell members of at least as high grade as that used in the piping of high grade practice, welding the projecting members to the steel tubing, preferably electrically.

I reduce the tubular body of the outer shell at 21 to the size of the inner shell, welding it at 22 to a short length of straight pipe 23 threaded into the flange 10.

The flanges 10 and 12 may be of any suitable type, usually desirably the same as the other flanges of the line in which the joint is to be located. I also weld the lugs 24 for the gland bolts 25 around the outside of the packing box end of the outer shell.

This construction permits the gland bolts to lie very close to the outside circumference of the shell member 6, and, with a sufficiently small outward radial extension for the flange 26 of the packing gland, everything will be within the outside lines of the pipe flanges 10 and 12.

The joint may be made double as indicated in Figure 3, the construction of which is evident from the figure and may be precisely like that of the single type already described except that the outer shell member 6' has no reduced portion fastened to a pipe of the size of the sliding member.

The outer member is desirably counterbored as before at the ends to receive the enlarged ends of the cylinder guide members 13 which form the bottoms of the stuffing boxes at the opposite ends of the outer member 6'.

As before the lugs 24 for the gland bolts 25 are welded to the tubular body, thereby allowing the bodies of the bolts to hug very closely the outside circumference of the outer shell, permitting a smallness in the sizes of the gland flanges 26 that is particularly desirable from the standpoint of permitting the use of the joint in any conduit adapted to receive the standard piping with which the joint is to be used.

The welding thus permits the use of the high grade tubular steel with a resultant thinness of the shell walls that permits ample radial space between the cylinder guides and the outside shell, thereby avoiding differences in temperature between the slide members and the guide members. Thus I am enabled to secure close fitting between these members at ordinary temperatures without danger of having the members stick together when subjected to the high temperature of steam-line service, such sticking together being incident to any greater temperature of the slide members as compared to that of the cylinder guide.

The form shown in Figures 4 and 5 has special advantages in that the cylindrical guide 13, especially the radially extending ring portion 14, and the outer shell 6, will more uniformly expand with respect to the inner member 5. Otherwise the structure of Figure 4 is essentially that seen in Figure 1, with the exception of the anchors 7 and 8, which are not necessary to my invention.

In the form of Figures 4 and 5 the cylindrical guide 13 is provided with slits 27 about the circumference in axial planes extending radially. The slits desirably penetrate the entire ring portion 14 and a part of the resilient guide portion 13.

Steam or other hot medium from the line enters the annular space between the guide 13 and the outer shell 6, and thence is admitted to the slots 27. In this way the hot medium is in contact with the inside of the outer shell 6 where it supports the guide 13, with the guide 13, especially at its radially extending portion 14, and with the outside of the inner sliding member 5, all at spaced points about the circumference.

The heating of the ring 14 to the temperature of the pipe line interior is quite desirable because the ring is thick and compact, and without the use of slots to admit hot medium at points within the ring, the ring may not expand to the same extent as the inner slide 5, causing the slide to jam.

Slitting of the radially extending ring 14 serves the further function of making the ring more resilient so that it will yield more readily when the inner slide 5 expands.

In order to prevent the packing material 11 from penetrating the slits 27, I provide a ring 28 extending about the base of the packing gland.

I also have provided guides around the outside of the slide member that are cylinders which effectively shield the surface of the slides from receiving deposits of scale, rust or the like from the pipe. The close fitting cylinder guide furthermore serves to protect the packing 11 from slugs of water, dirt or scale which would otherwise more quickly eat out the packing.

In addition, the cylindrical guide serves as a primary packing, so that the pressure against the high pressure side of the packing 11 will be somewhat less than the internal pipe pressure. This effect will of course exist largely in the form of Figures 1, 2 and 3 rather than in that of Figures 4 and 5.

In Figures 6 and 7 I show a cylindrical guide designed to use this primary packing action of the guide to greater advantage. The guide 13 is internally provided with circumferential grooves 29 serving to progressively reduce the pressure until that applied against the packing ring 11 will be considerably below the internal pipe pressure. The guide will thus act as a labyrinth packing. The pressure in the first groove $29'$ will be slightly less than that in the pipe line, and the pressure in the second groove $29^2$ will be somewhat less than that in $29'$, and this progressive reduction will take place in steps toward the packing 11.

The advantage of the labyrinth packing form of Figures 6 and 7 may to some extent be combined with those of the slotted form of Figures 4 and 5, as shown in Figure 8, though I do not consider this as desirable as either of these forms for their special purposes. In Figure 8 the slots $27'$ extend only partly through the ring 14 and the resilient guide 13, so that the full advantage of the labyrinth packing is obtained and the slots $27'$ allow expansion of the ring 14 and maintenance of the pipe line temperature about the ring.

I also have provided a wide spacing between stops limiting the opening of the joint, using stud bolts widely spaced from one another, the space between the bolts permitting easy elimination of scale or the like from the outside of the portion of the slide projecting beyond its guide.

When the joints expand in service, such deposits scrape off against the end of the guide which closely fits the slide and have had a tendency to catch between the end of the guide and any continuous abutment presented circumferentially around the end of the slide member.

With my wide spacing of the stop studs this deposit finds passage between the stops during the joint expansions, the stops pressing into and passing through the accumulating scrapings at the end of the guide to approach the end of the guide as the slide moves further into the guide.

I also have provided the trap connection 20 at the bottom of the outer member, which is advantageous in that it prevents accumulation of water when the trap is used in steam lines and thereby prevents the temperature differentials which I find it so desirable to avoid.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:—

1. In an expansion joint, an outer pipe, an inner pipe telescoping therein, and a separate external cylindrical guide for the inner pipe, radially extended over part of its length to fit within, and secured at intervals to the interior wall of the outer pipe, and elsewhere radially spaced from the outer pipe to admit the medium from the pipe about the guide.

2. In an expansion joint, an outer pipe, an inner pipe telescoping therein, and a separate external cylindrical guide for the inner pipe annularly enlarged at one end to fit the interior wall of the outer pipe and welded thereto at points about the outer pipe circumference.

3. In an expansion joint, inner and outer pipe sections telescoping one with another, the outside of the inner pipe being spaced inwardly from the inside of the outer pipe, a separate external cylindrical guide for the inner pipe having a portion of its length spaced inwardly from the wall of the outer pipe and a radially enlarged end extending outwardly to the inside of the outer pipe, and a stuffing box between the outer and inner pipes whose bottom is formed by the enlarged end of the guide.

4. In an expansion joint, an outer pipe counterbored at one end, an inner pipe having one end telescoping with the counterbored end of the outer pipe and its outside spaced inwardly from the inside of the outer pipe, a ring separate from the outer pipe fitting the counterbore and the outside of the inner pipe to form the bottom of a packing box between the counterbored portion of the outer pipe and the inner pipe, and a cylindrical extension from the ring fitting the outside of the inner pipe and spaced inwardly from the inside of the outer pipe.

5. In an expansion joint, an outer pipe counterbored at one end, an inner pipe having one end telescoping with the counterbored end of the outer pipe and its outside spaced inwardly from the inside of the outer pipe, a ring fitting the counterbore and the outside of the inner pipe to form the bottom of a packing box between the counterbored portion of the outer pipe and the inner pipe, a cylindrical extension from the ring fitting the outside of the inner pipe and spaced inwardly from the inside of the outer pipe, and circumferentially spaced outward projections on the end of the inner pipe beyond the cylindrical extension and within the outer pipe.

6. In an expansion joint, an outer pipe counterbored at one end, an inner pipe having one end telescoping with the counterbored end of the outer pipe and its outside spaced inwardly from the inside of the outer pipe, a ring fitting the counterbore and the outside of the inner pipe to form the bottom of a packing box between the counterbored portion of the outer pipe and the inner pipe, a cylindrical extension from the ring fitting the outside of the inner pipe and spaced inwardly from the inside of the outer pipe, and stud bolts threaded into the inner pipe at the inner end thereof at spaced intervals around its circumference adapted to engage the end of the extension to prevent excessive opening of the joint.

7. In an expansion joint, an outer pipe counterbored at one end, an inner pipe having one end telescoping with the counterbored end of the outer pipe and its outside spaced inwardly from the inside of the outer pipe, a ring separate from the outer pipe fitting the counterbore and the outside of the inner pipe to form the bottom of a packing box between the counterbored portion of the outer pipe and the inner pipe, a cylindrical extension from the ring fitting the outside of the inner pipe and spaced inwardly from the inside of the outer pipe, a gland fitting the packing box and having an outwardly extending flange beyond the end of the outer pipe, and gland lugs spaced around the end of the outer pipe, welded thereto and radially extending less than the gland flange.

8. In an expansion joint, an outer pipe counterbored at one end, an inner pipe having one end telescoping with the counterbored end of the outer pipe and its outside spaced inwardly from the inside of the outer pipe, a ring fitting the counterbore and the outside of the inner pipe to form the bottom of a packing box between the counterbored portion of the outer pipe and the inner pipe, a cylindrical extension from the ring fitting the outside of the inner pipe and spaced inwardly from the inside of the outer pipe, stud bolts threaded into the inner pipe at the inner end thereof at spaced intervals around its circumference adapted to engage the end of the extension to prevent excessive opening of the joint and a trap connection in the outside pipe registering with the stud bolt positions adapted to permit access to place or remove the stud bolts.

9. In an expansion joint, an outer pipe counterbored at one end, an inner pipe having one end telescoping with the counterbored end of the outer pipe and its outside spaced inwardly from the inside of the outer pipe, a ring separate from the outer pipe fitting the counterbore and the outside of the inner pipe to form the bottom of a packing box between the counterbored portion of the outer pipe and the inner pipe, a cylindrical extension from the ring fitting the outside of the inner pipe and spaced inwardly from the inside of the outer pipe, and welded connections between the ring and the outside pipe at spaced intervals around its circumference.

10. In an expansion joint, an outer pipe counterbored at one end, an inner pipe having one end telescoping with the counterbored end of the outer pipe and its outside spaced inwardly from the inside of the outer pipe, a ring separate from the outer pipe fitting the counterbore and the outside of the inner pipe to form the bottom of a packing box between the counterbored portion of the outer pipe and the inner pipe and a cylindrical extension from the ring fitting the outside of the inner pipe and spaced inwardly from the inside of the outer pipe, the pipe sections comprising tubular steel bodies, the steel body of the outer pipe having an outer end reduced in diameter and a straight pipe of the reduced section welded thereto.

11. In an expansion joint, an outer pipe, an inner pipe telescoping therein, and an external cylindrical guide for the inner pipe, radially extended over part of its length to fit within, and secured to the interior wall of the outer pipe, elsewhere radially spaced from the outer pipe to admit the medium from the pipe about the guide, and slitted adjacent the radially extended part at circumferentially spaced intervals.

12. In an expansion joint, an outer pipe, an inner pipe telescoping therein, and an external cylindrical guide for the inner pipe, radially extended over part of its length to fit within, and secured to the interior wall of the outer pipe, elsewhere radially spaced from the outer pipe to admit the medium from the pipe about the guide, and radially slitted parallel to its axis through the radially extended part at circumferentially spaced intervals.

13. In an expansion joint, an outer pipe, an inner pipe telescoping therein, and an external cylindrical guide for the inner pipe, radially extended over part of its length to fit within, and secured to the interior wall of the outer pipe, elsewhere radially spaced from the outer pipe to admit the medium from the pipe about the guide, and radially slitted through the radially extended part and a portion of the radially spaced part.

14. In an expansion joint, inner and outer pipe sections telescoping one with another, the outside of the inner pipe being spaced inwardly from the inside of the outer pipe, an external cylindrical guide for the inner pipe having a portion of its length spaced inwardly from the wall of the outer pipe, and a radially enlarged end extending outwardly to the inside of the outer pipe, and slitted adjacent the radially enlarged end at circumferentially spaced intervals, a stuffing box between the outer and inner pipes, and a ring forming the bottom of the stuffing box and seating against the enlarged end of the guide.

15. In an expansion joint, an outer pipe, an inner pipe telescoping therein, an external cylidrical guide for the inner pipe, radially extended over part of its length to fit within, and secured to the interior wall of the outer pipe, elsewhere radially spaced from the outer pipe to admit the medium from the pipe about the guide, and interiorly circumferentially grooved at intervals along the guiding face.

16. In an expansion joint, an outer pipe, an inner pipe telescoping therein, an external cylindrical guide for the inner pipe, radially extended over part of its length to fit within, and secured to the interior wall of the outer pipe, elsewhere radially spaced from the outer pipe to admit the medium from the pipe about the guide, and a labyrinth packing on the interior wall of the guide.

17. In an expansion joint, an outer pipe, an inner pipe telescoping therein, an external cylindrical guide for the inner pipe, radially extended over part of its length to fit within, and secured to the interior wall of the outer pipe, elsewhere radially spaced from the outer pipe to admit the medium from the pipe about the guide, and inwardly slitted to a depth less than the thickness adjacent the radially extended guide end at circumferentially spaced intervals and interiorly circumferentially grooved at intervals along the guiding face, the grooves at no place directly communicating with the slits.

18. In an expansion joint, an outer pipe, an inner pipe telescoping therein, an external cylindrical guide for the inner pipe, radially extended over part of its length to fit within and secured to the interior wall of the outer pipe, a packing gland between the inner and outer pipes with its bottom against the radially extended portion of the guide, and a labyrinth packing on the inner guide surface.

JOHN F. McKEE.